United States Patent [19]

Mizuno

[11] Patent Number: 4,870,933
[45] Date of Patent: Oct. 3, 1989

[54] FUEL CONTROL SYSTEM FOR AN AUTOMOTIVE ENGINE

[75] Inventor: Shigeo Mizuno, Mitaka, Japan

[73] Assignee: Fuji Jukogyo Kabushiki Kaisha, Tokyo, Japan

[21] Appl. No.: 156,383

[22] Filed: Feb. 16, 1988

[30] Foreign Application Priority Data

Feb. 27, 1987 [JP] Japan ............... 62-046598

[51] Int. Cl.$^4$ ............... F02D 41/12
[52] U.S. Cl. ............... 123/325; 123/327; 123/585
[58] Field of Search ............... 123/325, 326, 339, 585, 123/493, 324, 327

[56] References Cited

U.S. PATENT DOCUMENTS 4,444,168  4/1984  Matsumura et al. ............... 123/339
4,672,936  6/1987  Abe ............... 123/339
4,700,673  10/1987  Denz ............... 123/325

FOREIGN PATENT DOCUMENTS 57-97044  6/1982  Japan ............... 123/339

Primary Examiner—Andrew M. Dolinar
Attorney, Agent, or Firm—Martin A. Farber

[57] ABSTRACT

A fuel control system for providing a dashpot operation at release of an accelerator pedal of a motor vehicle. A bypass is provided around a throttle valve of an engine and an idle speed control valve is provided in the bypass, for controlling air passing in the bypass. When the accelerator pedal of the motor vehicle is released, an idle signal is produced. In response to the idle signal, idle speed control valve is gradually closed. After a set time, fuel supply by a fuel injector is cut off.

6 Claims, 2 Drawing Sheets

FUEL CONTROL SYSTEM FOR AN AUTOMOTIVE ENGINE

BACKGROUND OF THE INVENTION

The present invention relates to a fuel control system for an engine having an electronic fuel injection system, and more particularly to a control system for performing dashpot operation at release of an accelerator pedal of a motor vehicle during the driving of the vehicle.

In a conventional engine having an idle speed control valve in a bypass around a throttle valve, a dashpot control system is provided for delaying closing the idle speed control valve when the accelerator pedal is released to turn on an idle switch, so as to prevent engine speed from suddenly reducing. At the same time, fuel injectors are closed by a signal of the idle switch to cut off the fuel supply, for improving fuel consumption. Japanese Patent Applications Laid-Open Nos. 56-20735 and 58-25544 disclose such a fuel cut off system.

However, when the fuel is cut off, the power of the engine is greatly reduced. As a result, the operation by the dashpot control system is not effected, and hence large deceleration shock arises at the release of the accelerator pedal.

SUMMARY OF THE INVENTION

The object of the present invention is to provide a fuel control system which may reduce the deceleration shock at the release of the accelerator pedal.

According to the present invention, there is provided a fuel control system for a motor vehicle driven by an automotive engine which has a throttle valve and at least one fuel injector, the system comprising a bypass around the throttle valve, an idle speed control valve provided in the bypass, for controlling air passing in the bypass, an electrically operated actuator for operating the idle speed control valve, an idle switch for producing an idle signal when an accelerator pedal of the motor vehicle is released.

The control system has control means responsive to the idle signal for operating the actuator so as to gradually close the idle speed control valve to a closed position, timer means responsive to the idle signal for producing a timer signal after a set time, and fuel cutoff means responsive to the timer signal for cutting off fuel supply by the fuel injector.

The other objects and features of this invention will become understood from the following description with reference to the accompanying drawings.

DETAILED DESCRIPTION OF THE PREFERRED EMBODIMENTS

Figure 1:
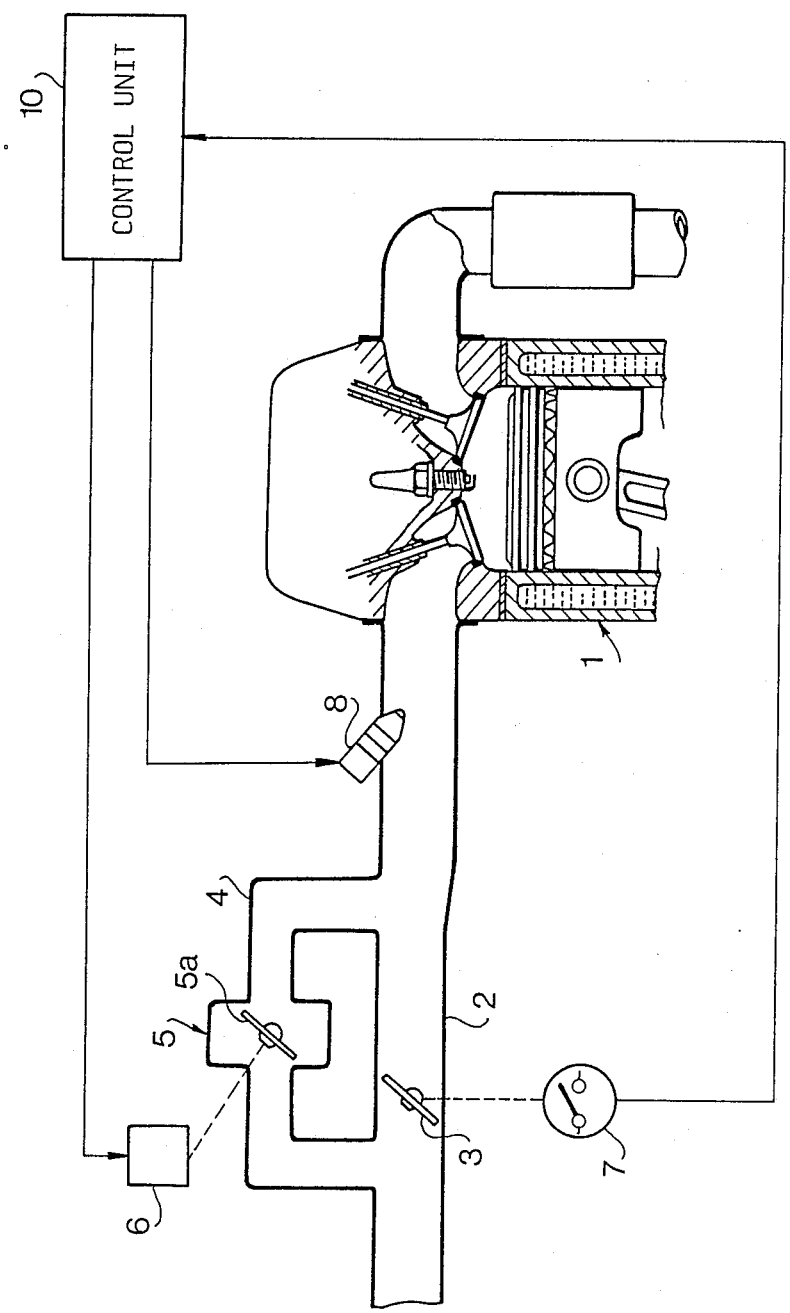
FIG. 1 is a schematic diagram showing a system of the present invention.

Referring to FIG. 1, an intake passage 2 of an engine 1 for a motor vehicle has a throttle valve 3 and a bypass passage 4 around the throttle valve 3. The system of the invention has an idle/dashpot control device 5 comprising an idle speed control valve 5a provided in the bypass 4 and an electrically operated actuator 6. The actuator 6 is, for example, a solenoid for operating the control valve 5a. The idle/dashpot control device 5 is provided for preventing sudden reduction of engine speed at release of an accelerator pedal (not shown) of the vehicle. An idle switch 7 is provided to be operated by the accelerator pedal. The idle switch 7 is adapted to be turned on when the accelerator pedal is released and produces an idle signal (a deceleration signal) which is applied to a control unit 10. The control unit 10 produces an output signal dependent on the idle signal from the idle switch 7, which is applied to to the actuator 6 of the idle/dashpot control device 5 for operating the idle speed control valve 5a. In response to the output signal, the actuator 6 operates to slowly close the idle speed control valve 5a. The control unit 10 further supplies an output signal to a fuel injector 8 provided in the intake passage 2 to cut off the fuel supply. The control unit 10 is adapted to produce the signal for cutting off the fuel when t1 seconds have elapsed after the output signal of the control unit 10 is applied to the actuator 6.

Figure 2:
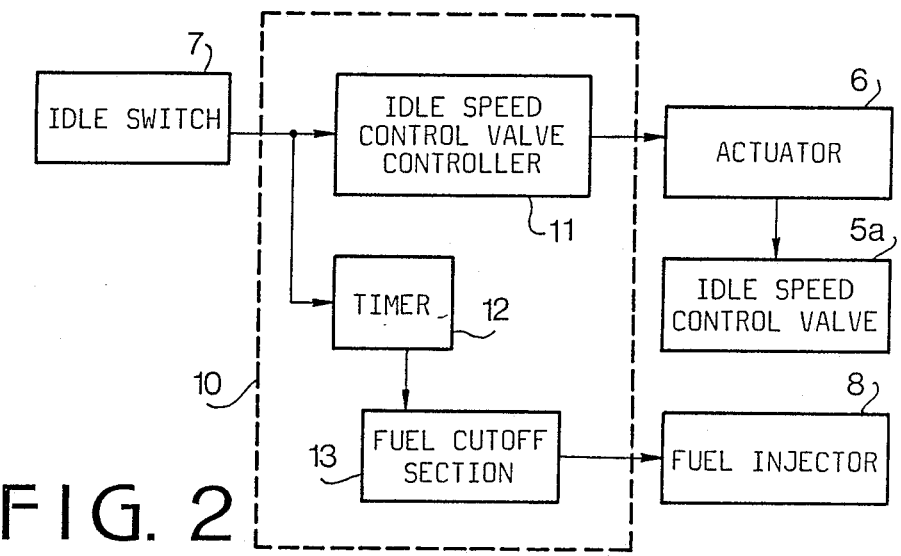
FIG. 2 is a block diagram of a control unit of the present invention.

Referring to FIG. 2, the control unit 10 comprises an idle speed control valve controller 11 and a timer 12, both of which are applied with the signal of the idle switch 7, and a fuel cutoff section 13 which is applied with a signal of the timer 12 for cutting off the fuel.

Figure 3:
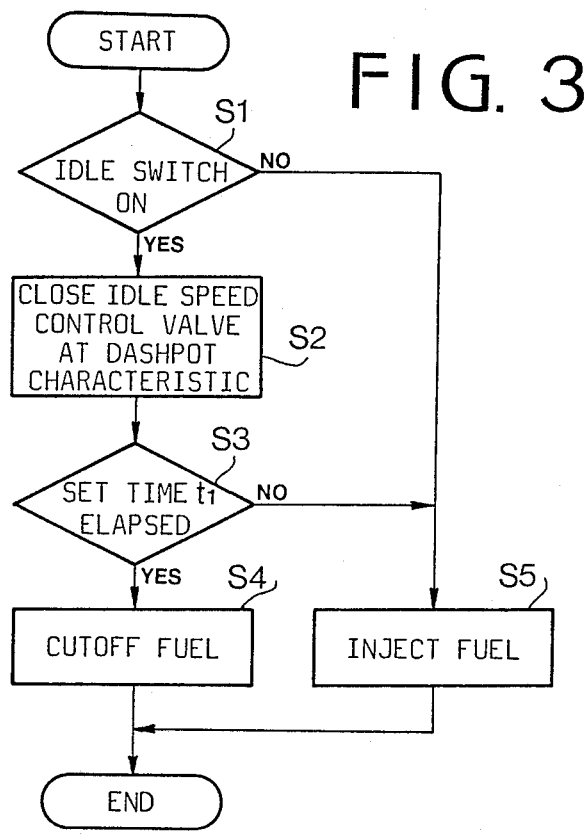
FIG. 3 is a flow chart showing operation of the control unit.

The operation of the control unit 10 will be described with reference to a flow chart of FIG. 3.

When the accelerator pedal is released during the driving of the vehicle, the throttle valve 3 closes and the idle switch 7 is turned on. At a step S1, it is determined whether the idle switch 7 is ON. The idle switch 7 produces the ON-signal, that is, the deceleration signal which is applied to the idle speed control valve controller 11. The controller 11 produces a close signal which is fed to the actuator 6. The actuator 6 operates to close the idle speed control valve 5a which has been maintained at an opening degree. The actuator 6 operates to gradually close the idle speed control valve 5a in accordance with a predetermined dashpot characteristic (step S2). The ON-signal of the idle switch 7 is applied to the timer 12 for setting the timer. When a set time (about 0.5 to 1.0 seconds) elapses, the timer 12 produces an output signal which is fed to the fuel cutoff section 13 (step S3). The fuel cutoff section 13 produces a signal based on the output signal which is applied to fuel injectors 8 to cut off the fuel (step S4). Thus, the fuel cutoff is performed with a predetermined delay after the idle switch 7 is turned on.

Accordingly, the idle/dashpot control device 5 operates to slowly close the idle speed control valve 5a, and the power of the engine is gradually reduced in accordance with the dashpot characteristic. After the dashpot operation is started, the fuel is cut off with a predetermined delay. Thus, deceleration shock on the vehicle at the release of the accelerator pedal can be alleviated.

When the idle switch 7 is not turned on or until the set time of the timer 12 elapses, fuel is supplied in dependency on the quantity of intake air at a step S5.

In accordance with the present invention, the fuel is cut off when a set time elapses after the release of the accelerator pedal. Thus, the deceleration shock on the vehicle can be alleviated.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A fuel control system for a motor vehicle driven by an automotive engine which has a throttle valve and at least one fuel injector for injecting fuel into the engine, the system comprising:

an air bypass around the throttle valve;
   an idle speed control valve provided in the bypass, for controlling air passing in the bypass;
   an electrically operated actuator for operating the idle speed control valve;
   an idle switch for generating an idle signal whenever an accelerator pedal of the motor vehicle is released; the accelerator pedal being operatively connected to the throttle valve;
   control means responsive to the idle signal for operating the actuator so as to gradually close the idle speed control valve to a closed position in accordance with a predetermined dashpot characteristic so as to prevent engine speed from suddenly reducing;
   timer means responsive to the idle signal for producing a timer signal whenever the idle signal is generated after a set time has elapsed; and
   fuel cutoff means responsive to the timer signal for cutting off fuel supply by the fuel injector so as to reduce deceleration shock upon release of the accelerator pedal.

2. The system according to claim 1 wherein the actuator is a solenoid operated actuator.

3. The system according to claim 1 wherein the timer means is a timer.

4. A fuel control system according to claim 1, wherein
   the set time is between about 0.5 to 1.0 seconds.

5. A fuel control system according to claim 1, wherein
   said control means operates the actuator so as to gradually close the idle speed control valve to the closed position in accordance with said predetermined dashpot characteristic, whereby power of the engine is gradually reduced in accordance with the dashpot characteristic.

6. A fuel control system according to claim 1, wherein
   the accelerator pedal controls the throttle valve, and said idle switch is operatively connected to and responsive to the throttle valve.

* * * * *